UNITED STATES PATENT OFFICE.

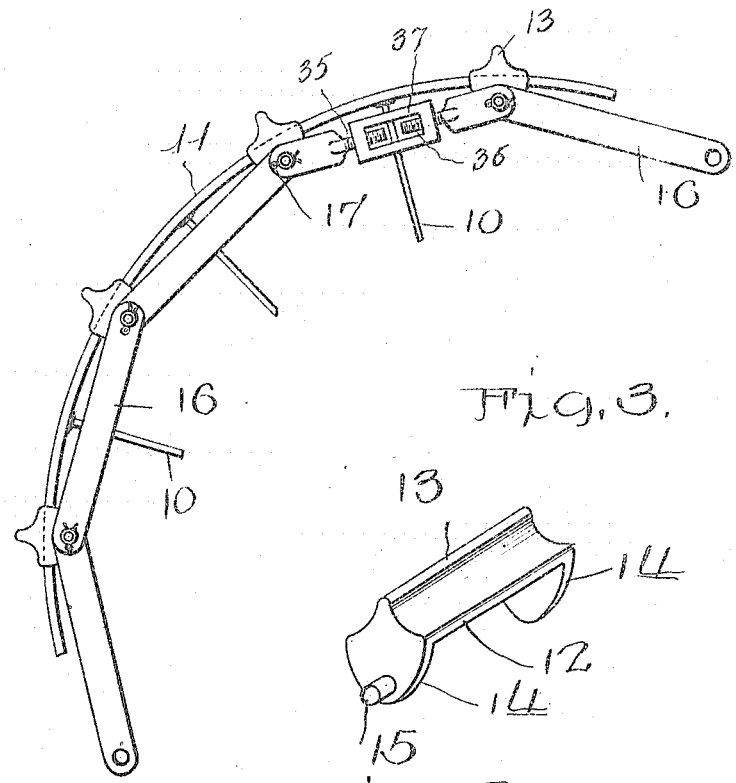
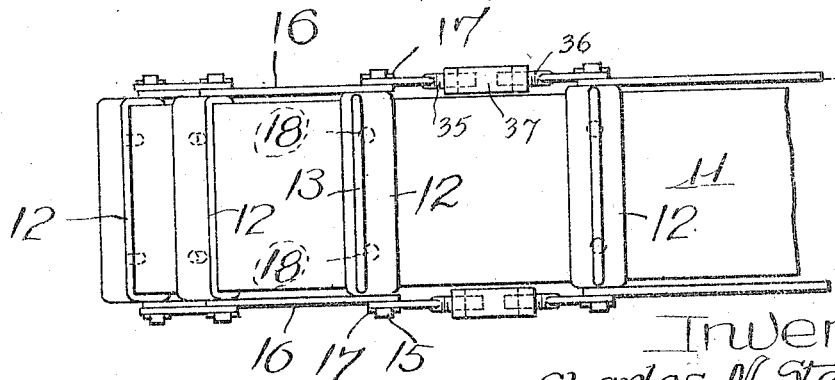

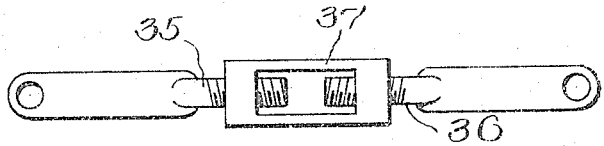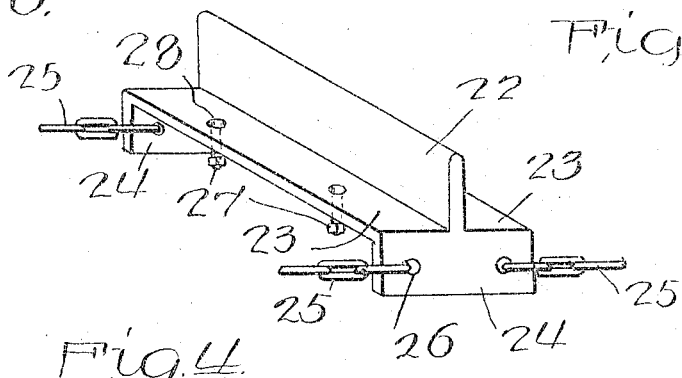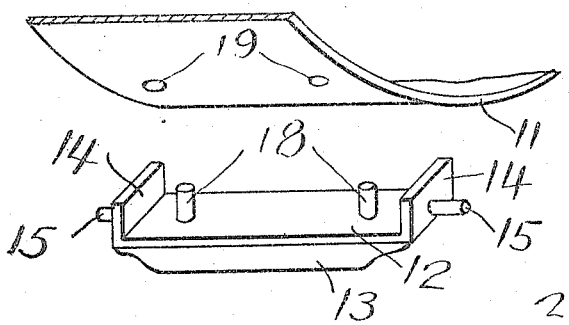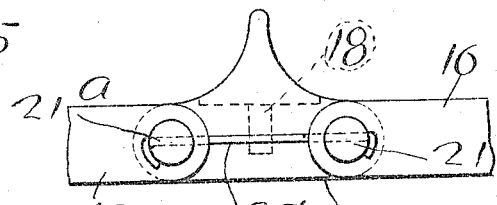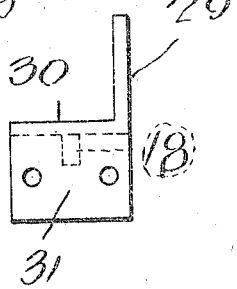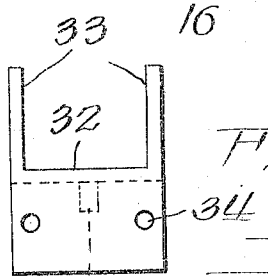

CHARLES M. STEWARD, OF PLANO, ILLINOIS.

REMOVABLE SPUR FOR TREADS OF TRACTOR-WHEELS.

1,270,984. Specification of Letters Patent. Patented July 2, 1918.

Application filed August 7, 1916. Serial No. 113,544.

*To all whom it may concern:*

Be it known that I, CHARLES M. STEWARD, a citizen of the United States, and a resident of Plano, county of Kendall, and State of Illinois, have invented certain new and useful Improvements in Removable Spurs for Treads of Tractor-Wheels, of which the following is a specification.

My invention relates to spurs or ribs for treads of tractor wheels and more particularly to a device that is removable for the purpose of adjustment, repair and the like.

One of the objects of my invention is the provision of a device of this character that is constructed so that it may be readily and quickly applied to tractor wheels already in use, without materially altering either the rim of the wheel or the construction of the spurs. Another object of my invention is the provision of a plurality of removable spurs that are adapted to be united by links and capable of being stored in a comparatively small space when removed from the wheel. A still further object of my invention is the provision of a spur that is capable of elasticity in its connecting members and which may be so installed upon the wheel that the danger of the wheel rotating independently of the spurs is eliminated. Other objects of my invention are the provision of a removable spur or rib that is easily and readily constructed, economical to manufacture and effective in its operation.

I prefer to accomplish the divers objects of my invention by the means and in the manner hereinafter fully described and as more particularly pointed out in the claims, reference being had to the accompanying drawings forming a part of this specification, wherein—

Figure 1 is a side elevation of a fragment of a tractor wheel showing my invention applied thereto.

Fig. 2 is a top plan of the structure shown in Fig. 1.

Fig. 3 is a perspective view of one of the spurs or ribs removed from the connecting links so as to illustrate its specific construction.

Fig. 4 is a perspective view of the under portion of a tractor wheel tread, showing a spur or rib about to be secured or mounted thereon.

Fig. 5 is a side elevation, slightly enlarged, showing a modified construction of the lateral flange of the spur or rib.

Fig. 6 is a perspective view illustrating modified construction of my invention, the connecting links being substituted by chains and the rib formed of commercial angle-metal of T-shape cross-section.

Fig. 7 is a vertical end elevation of another modified construction of the flange or spur, the same being of L-shape cross-section.

Fig. 8 is a view similar to Fig. 7, of a spur or rib constructed of channel metal, and Fig. 9 is an elevation of an adjustable link, or means for connecting the chain of spurs to take up any slack or play that may be occasioned.

Referring to the drawings and more particularly to Figs. 1 and 2 thereof, I have shown a tractor wheel comprising a plurality of spokes 10, the outer ends whereof are swaged or otherwise suitably secured to a felly or tire 11. It is the usual practice in the manufacture of tractor wheels to provide either spurs, flanges or transverse ribs upon the tread of the wheel, so that when the same are in operation, sufficient traction will be developed between the wheels and the ground upon which the vehicle is traveling. These ribs are usually permanently secured upon the rim or tread of the wheel, and when the tractor is being conveyed from one location to another upon a road or highway, the ribs or flanges mutilate and injure the road-bed.

I have provided a removable set of spurs that are capable of being detached or taken off the wheel when the tractor is traversing a highway.

My improved spur or rib preferably comprises a metal piece, shown in perspective in Fig. 3 of the drawings, where it will be observed the same comprises a base portion 12 and an upstanding longitudinally elongated flange 13, that extends from end to end of the base and projects above the same a distance sufficient to permit the flange 13 to grip the ground. Suitable down-turned lugs 14 are provided at the ends of the base 12 and are adapted to extend down over the side of the tread or rim of the tractor wheel and prevent lateral movement of the spur or rib thereon, and studs 15 project laterally from these lugs 14 and have suitable links 16 mounted thereon, which links are retained in position by transverse cotter-pins 17. This structure provides a continuous elongated construction made up of a plurality of longitudinally disposed, substantially parallel links 16, and transverse connecting bars or spurs 12, which are placed around the traction wheel and secured together by the links and cotter-pins, as described. It is obvious that a slight amount of slippage incident to the power exerted by the engine of the tractor, will probably take place between the spurs and the wheel rim, and in order to take care of this contingency and prevent any longitudinal slippage, I have provided downwardly projecting studs 18 upon the under-face of the body member 12, as clearly shown in Fig. 4. These studs are adapted to enter suitable holes 19, bored in the rim of the tractor wheel and, if desired, one, two or more (or all) of the spurs may be provided with these studs. I have found, however, that two, three or four sets of spurs are sufficient for this purpose.

In lieu of the single projecting stud 15, shown in the construction just described, the lateral flange 20 (Fig. 5) may be elongated slightly and two pivotal projections 21 and 21ª may be provided so that the links, when secured to this spur or rib, will not engage one another, and one end of a link may be removed without the liability of loosening the adjacent end of the opposite link, otherwise the structure illustrated in Fig. 5 is similar to that shown in Figs. 1, 2 and 3 of the drawings.

While I may conveniently employ cotter-pins in the structure illustrated in Fig. 5, I preferably employ a wire 37, which is adapted to pass first through one lug 21, and then down and up through the adjoining lug 21ª. In this way the links 16 are easily laced into position.

In Fig. 6 I have illustrated a rib constructed of angle-metal, of commercial form (T-shape), the web 22 whereof provides the rib, and the transverse flanges 23 provide the body portion. The web 22 is cut away adjacent the ends and the remaining portion 24 comprises the opposite flange and is turned downwardly to provide the lateral wings that prevent the rib from slipping off of the wheel laterally. In lieu of the links 16, I have provided suitable chains 25, that are connected through holes 26 bored in the down-turned flange 24. I have also provided bolts 27 that are tapped through the holes 28 in the flange and through corresponding alining holes in the rim, through which said bolts are adapted to pass and be secured by suitable nuts.

In Fig. 7 the rib is constructed of L-shape angle-metal, the upstanding flange 29 whereof provides the rib that is cut away adjacent its ends and has the remaining portion of this lower flange 30 bent downwardly to provide a lip 31.

The structure shown in Fig. 8 comprises a U-shape or channel metal, the web 32 whereof provides the body of the structure, and the flanges or parallel rims 33 provide the ribs. The flanges 33 are cut away adjacent their ends, similar to the manner of construction shown in Figs. 6 and 7, and the remaining portion of the web turned downwardly to provide the lip 34. In both of these last two structures the ribs are connected with each other by chains, and bolts are tapped through their webs to secure the same against slippage.

In assembling my removable spurs I find that means must be provided to take up any slack that may be occasioned by the difference in circumference that occurs in the tread of the wheel, and to meet this I interpose one or more adjustable links (as shown in Fig. 9) in the chain, which link comprises two adversely threaded studs 35 and 36 connected by a suitable turnbuckle 37.

While I have illustrated and described several specific ways of carrying out my invention, it, of course, will be obvious to others skilled in the art, that divers other modifications may be made without materially departing from the spirit of my invention. I therefore desire it understood that all such changes are contemplated as included within the scope of my invention as expressed in the appended claims.

What I claim is:—

1. In combination with a vehicle wheel having depressions in the tread thereof, a plurality of spurs adapted to extend upon the surface of the tread of said wheel, said spurs being provided with studs adapted to enter and coöperate with the depressions in the tread of said wheel, studs extending laterally from the ends of said spurs, and links pivotally secured to said laterally projecting studs adapted to connect the respective spurs.

2. In combination with a vehicle wheel having depressions in the tread thereof, a plurality of spurs adapted to extend upon the surface of said tread, said spurs being provided with studs adapted to enter said depressions, lateral extension at the end of each spur adapted to extend over and engage the edge of the wheel tread, and links pivotally connecting said spurs.

3. In combination with a vehicle wheel having a substantially flat tread that is provided with depressions, a plurality of spurs disposed transversely on said tread and at substantially right angles to the edges thereof, studs on the under surface of said spurs adapted to enter and coöperate with the depressions in said wheel tread, the ends of each spur provided with inwardly projecting flanges adapted to engage the opposite side edges of the wheel tread and elongated devices the ends whereof are pivotally connected to said flanges.

Signed at Plano, county of Kendall and State of Illinois, this 3rd day of August, 1916.

CHARLES M. STEWARD.

Witnesses:
HARRIET E. MIGHELL,
GLENN H. DAVIES.